United States Patent
Dathathraya et al.

(10) Patent No.: US 7,337,432 B2
(45) Date of Patent: Feb. 26, 2008

(54) SYSTEM AND METHOD FOR GENERATING AUTOMATIC TEST PLANS FOR GRAPHICAL USER INTERFACE APPLICATIONS

(75) Inventors: Sridhar Dathathraya, Cerritos, CA (US); Mark Liu Stevens, Laguna Hills, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 801 days.

(21) Appl. No.: 10/770,740

(22) Filed: Feb. 3, 2004

(65) Prior Publication Data

US 2005/0172270 A1 Aug. 4, 2005

(51) Int. Cl.
G06F 9/44 (2006.01)
(52) U.S. Cl. .................. 717/125; 717/127; 717/131
(58) Field of Classification Search ........ 717/124–127, 717/131
See application file for complete search history.

(56) References Cited

U.S. PATENT DOCUMENTS

| | | | | |
|---|---|---|---|---|
| 5,572,668 A | * | 11/1996 | See et al. ............ | 714/38 |
| 5,581,237 A | * | 12/1996 | DiPoala ............ | 340/554 |
| 5,881,219 A | * | 3/1999 | Leung et al. ........ | 714/31 |
| 6,064,381 A | * | 5/2000 | Harel ............ | 715/705 |
| 6,118,447 A | * | 9/2000 | Harel ............ | 717/131 |
| 6,384,843 B1 | * | 5/2002 | Harel ............ | 715/762 |
| 6,421,822 B1 | * | 7/2002 | Pavela ............ | 717/125 |
| 6,505,342 B1 | * | 1/2003 | Hartmann et al. ...... | 717/104 |
| 6,546,506 B1 | * | 4/2003 | Lewis ............ | 714/38 |
| 6,687,834 B1 | * | 2/2004 | Morales et al. ........ | 717/127 |
| 6,698,012 B1 | * | 2/2004 | Kossatchev et al. ...... | 717/126 |
| 6,775,824 B1 | * | 8/2004 | Osborne et al. ........ | 717/125 |
| 6,889,158 B2 | * | 5/2005 | Penov et al. ............ | 702/119 |
| 6,898,784 B1 | * | 5/2005 | Kossatchev et al. ...... | 717/126 |
| 6,934,934 B1 | * | 8/2005 | Osborne et al. ........ | 717/126 |
| 6,944,848 B2 | * | 9/2005 | Hartman et al. ........ | 717/124 |
| 6,978,440 B1 | * | 12/2005 | Pavela ............ | 717/125 |
| 7,010,782 B2 | * | 3/2006 | Narayan et al. ........ | 717/124 |
| 7,100,150 B2 | * | 8/2006 | Polk ............ | 717/124 |
| 2003/0005413 A1 | | 1/2003 | Beer et al. ............ | 717/125 |

FOREIGN PATENT DOCUMENTS

JP 7141224 6/1995
WO WO01/35219 5/2001

* cited by examiner

*Primary Examiner*—Todd Ingberg
(74) *Attorney, Agent, or Firm*—Law Office of Gerald Maliszewski; Gerald Maliszewski

(57) ABSTRACT

A system and method are provided for generating automatic test plans for GUI applications. The method comprises: launching a GUI application under test (AUT); discovering access paths to user interface (UI) elements in the AUT; generating logical access paths to the discovered UI elements; launching a test plan that uses the generated access paths; and, sending test messages to UI elements in the AUT. The method may identify UI element types such as a menu, sub-menu, check box, text box, or variable UI elements. Then, sending test messages to UI elements in the AUT includes sending corresponding test messages such as menu select, sub-menu select, check box select, text box fill, or variable fill command messages. For example, if a variable UI element is identified, sending test messages to UI elements in the AUT includes: sending a command to populate the variable UI elements; and, selecting the populated value.

22 Claims, 4 Drawing Sheets

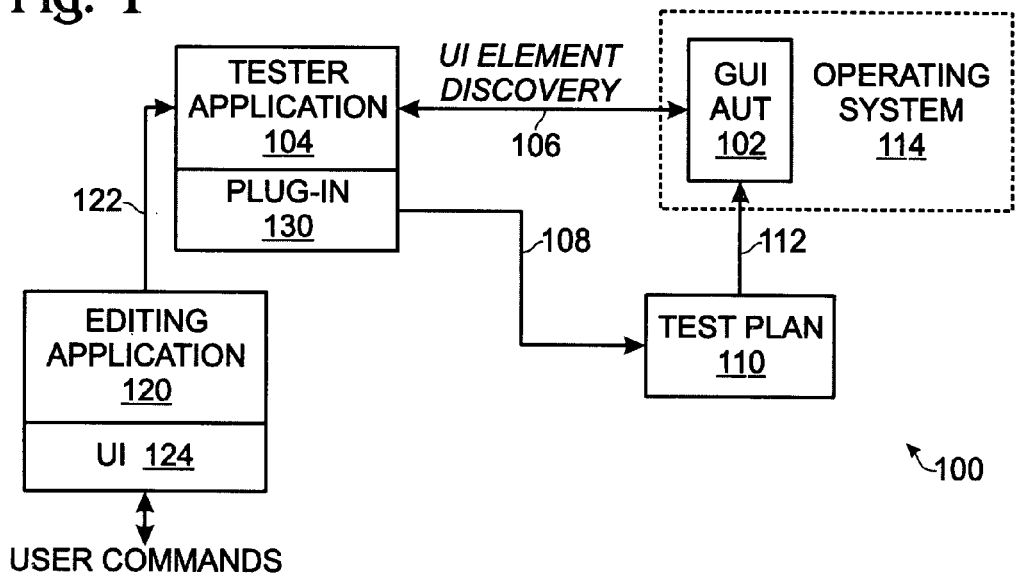
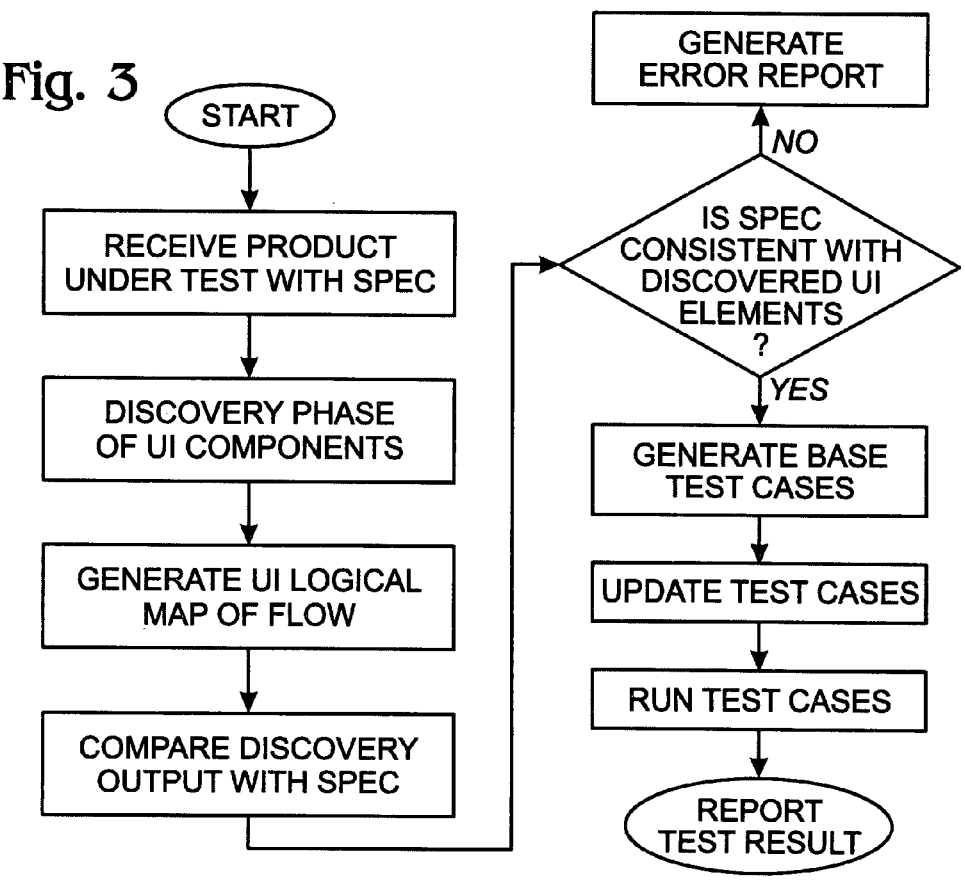

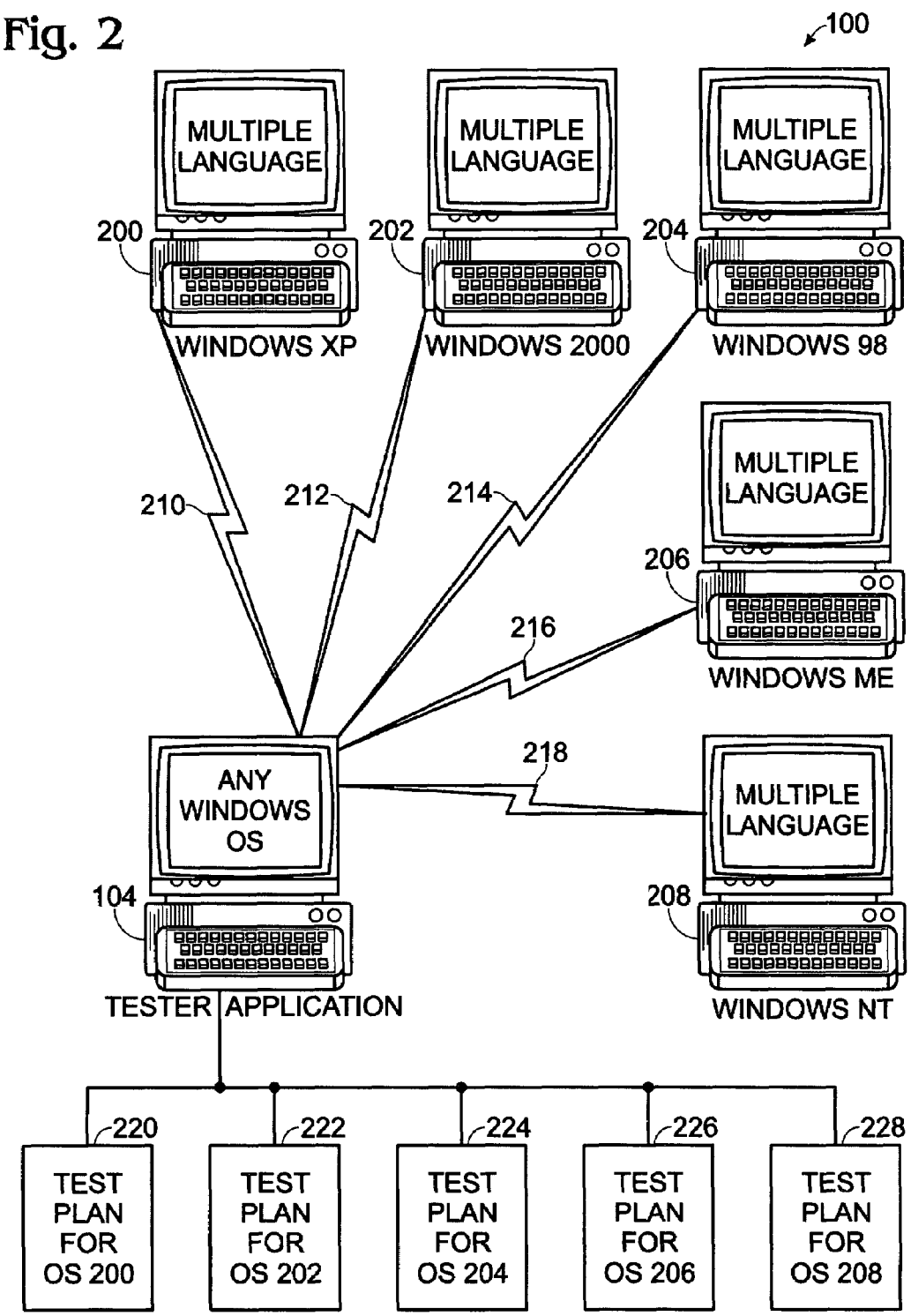

SYSTEM AND METHOD FOR GENERATING AUTOMATIC TEST PLANS FOR GRAPHICAL USER INTERFACE APPLICATIONS

BACKGROUND OF THE INVENTION

1. Field of the Invention

This invention generally relates to automated testing processes and, more particularly, to a system and method for automatically generating a plan for the testing of a microprocessor-driven software application.

2. Description of the Related Art

Computer software applications, such as Microsoft Windows-based applications, applications that appear like Windows applications, or other graphical user interface (GUI) applications are typically tested by quality assurance (QA) before distribution to the public, using test programs. The QA team usually installs the application and attempts to interact with the application using the interface provided by the application. This interface typically involves the selection of menu options and opening any dialog boxes provided by the application. QA will often attempt things unexpected by the program designers, such as the entry of invalid data. The test program can be automated to capture the user's interactions with the application and convert them into scripts. These scripts can be run and compared with subsequently tested versions of the application, to verify that the application is reacting as expected.

FIG. 5 is a flowchart illustrating a manual, human operator, process of generating a test plan (prior art). The problem with this approach is it relies on the expertise of the QA operator to identify all possible alternative routs in the exercise of a given feature or menu option. Often, a number of bugs are reported by the users of the application in the field, relating to features or options that QA did not identify or test using the test plan. Thus, the quality of the test plan is dependent upon the expertise of QA operator and/or their knowledge of the product and product field.

Another problem in the development of a high quality test plan results from the fact that QA typically only gets involved with the application during the final phases of the product development. In fact, QA often gets involved only during the release phase of the product. In an overwhelming majority of cases, a QA operator receives an application and is asked to test the application with out any documentation describing what, or how the testing should proceed.

The above-mentioned testing problems are compounded by the fact that the same application is expected to operate identically on a number of different computer operating systems. For example, a Windows application is typically expected to work with all, or most of the Microsoft operating systems currently in use by the public. Further, the application is expected to operate the same, regardless of the human language (i.e., English) used.

It would be advantageous if a software application test plan could be developed that fully exercised every menu and option presented by the application user interface (UI).

It would be advantageous if the above-mentioned test plan could be developed in response an automatic testing program that fully exercised all the possible options presented by an application UI.

SUMMARY OF THE INVENTION

Conventional, human operator-generated test plans are unreliable and do not produce consistent results. The present invention jump-starts the QA test plan by discovering all possible execution paths of an application and generates a baseline test plan. A QA operator may enhance, simplify, or modify the test plan by editing the generated scripts.

Accordingly, a method is provided for generating automatic test plans for GUI applications. The method comprises: launching a GUI application under test (AUT); discovering access paths to user interface (UI) elements in the AUT; generating logical access paths to the discovered UI elements; launching a test plan that uses the generated access paths; and, sending test messages to UI elements in the AUT.

For example, discovering access paths to UI elements in the AUT may include discovering access paths to a UI window having a menu to present selections and to accept user commands. In some aspects, launching a GUI AUT includes launching an MS Windows operating system AUT for a Microsoft Windows operating system such as Windows XP, Windows 2000, Windows 98, Windows ME, or Windows NT.

Some aspects of the method further comprise identifying UI element types such as a menu, sub-menu, check box, text box, or variable UI elements. Then, sending test messages to UI elements in the AUT includes sending corresponding test messages such as menu select, sub-menu select, check box select, text box fill, or variable fill command messages. For example, if a variable UI element is identified, sending test messages to UI elements in the AUT includes: sending a command to populate the variable UI elements with a value; and, selecting the populated value.

Other aspects of the method further comprise: launching a client editing application; generating a graphical test plan editing dialog; and, editing the test plan in response to the test plan editing dialog.

Additional details of the above-described method and a system for generating automatic test plans for GUI applications are provided below.

BRIEF DESCRIPTION OF THE DRAWINGS

FIG. 1 is a schematic block diagram of the present invention system for generating automatic test plans for GUI applications.

FIG. 2 is a schematic block diagram illustrating the present invention as used for testing an application with several computer operating systems.

FIG. 3 is a flowchart illustrating the present invention process for automatically generating a test plan.

DETAILED DESCRIPTION OF THE PREFERRED EMBODIMENTS

Figure 4:
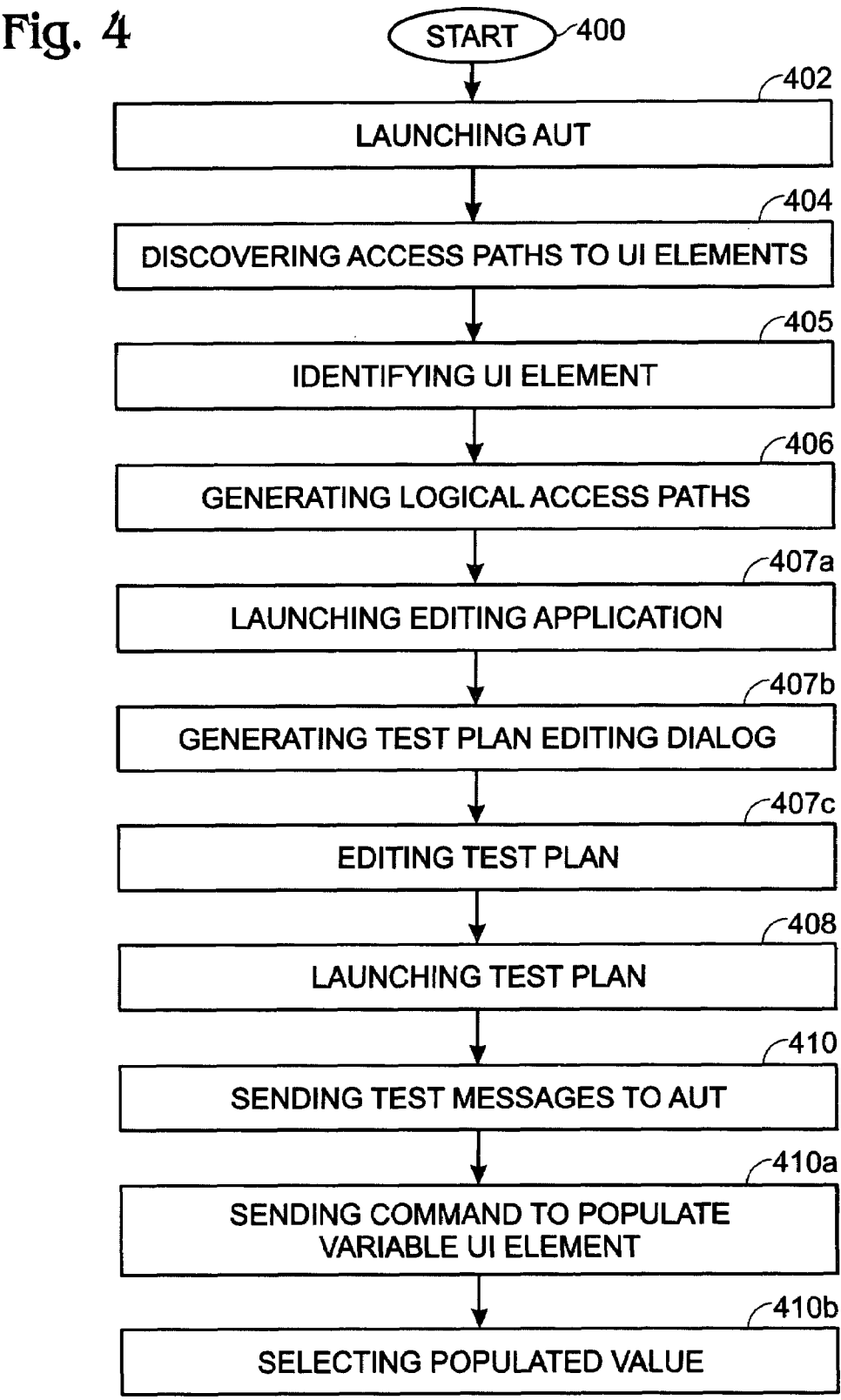
FIG. 4 is a flowchart illustrating an alternate aspect of the present invention method for generating graphical user interface (GUI) applications automatic test plans.
Figure 5:
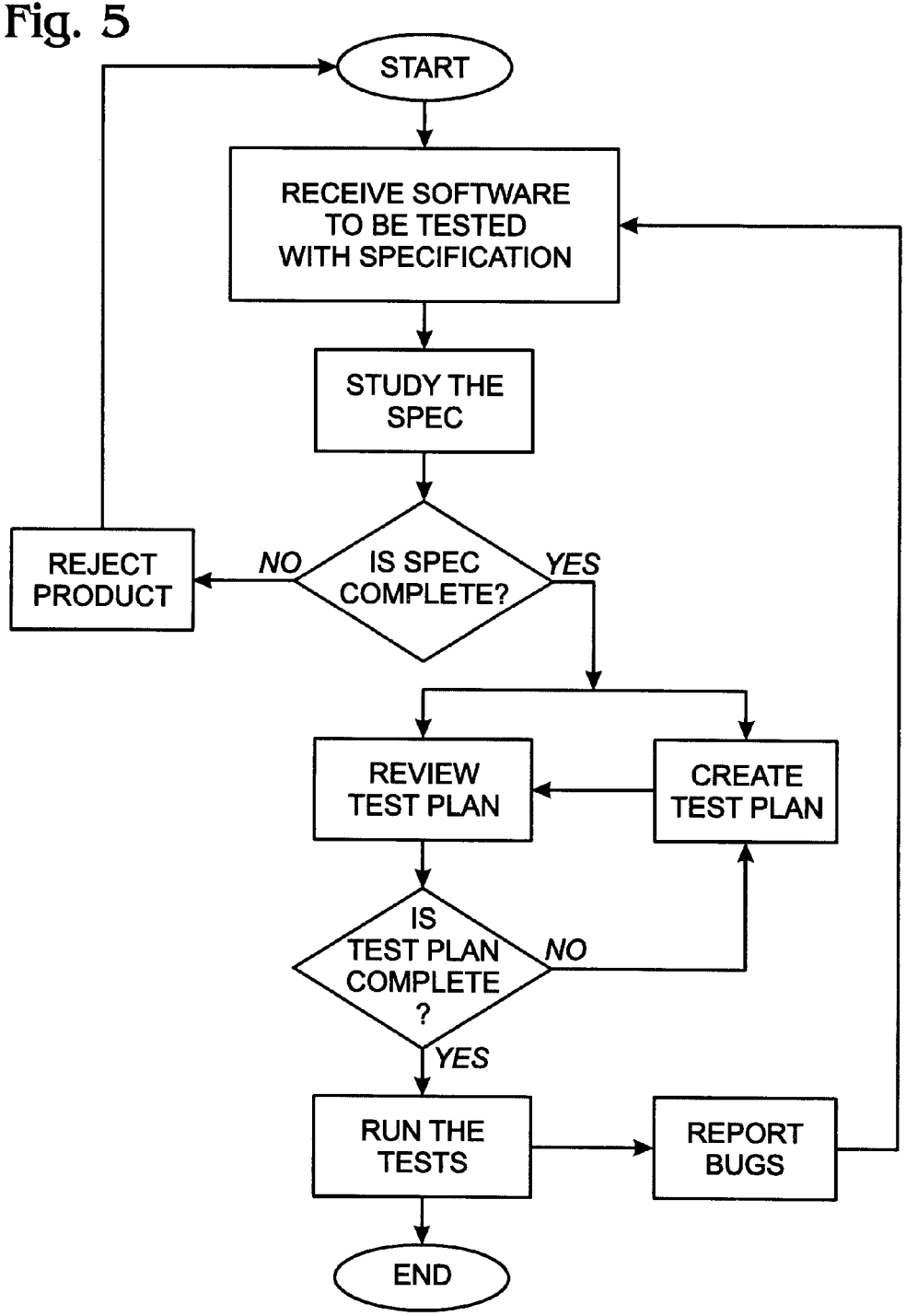
FIG. 5 is a flowchart illustrating a manual, human operator, process of generating a test plan (prior art).

FIG. 1 is a schematic block diagram of the present invention system for generating automatic test plans for GUI applications. The system 100 comprises a GUI application under test (AUT) 102 and a tester application 104. The tester application 104 has an interface on line 106 to discover access paths to user interface (UI) elements in the AUT and an interface on line 108 to supply a test plan 110 that generates logical access paths to the discovered UI elements. The test plan 110 has an interface with the AUT 102 on line 112 that uses the generated access paths to send test messages to UI elements in the AUT 102. Then, a script can be generated that includes the test messages and the responses to the test messages. Note, in some cases a human operator must evaluate whether a test message response is appropriate. Therefore, in most cases the script includes automatically generated test messages and human operator-evaluated test message responses.

It should be understood that the test plan 110 need not be operated simultaneously with the tester application 104, or even interfaced with the tester application when the test messages are sent to the AUT 102. For example, the test plan 110 may be generated in response to the original iteration of the AUT, and used to test a subsequent manifestation or revision of the application. It should also be understood that the various elements of the system 100 are sets of software instructions that may be stored in memory (not shown) and called using a microprocessor (not shown).

The tester application 104 discovers access paths to AUT UI element windows having a menu to present selections and to accept user commands. Menus are a typical GUI means by which an application interfaces with a user. However, other interfaces are possible. For example, a user may interface with an application using DOS or UNIX commands.

To illustrate the invention, it is further assumed that the system 100 comprises a Microsoft (MS) Windows operating system 114, and that the GUI AUT 102 is installed in the Windows operating system 114. For example, the Windows operating system can be Windows XP, Windows 2000, Windows 98, Windows ME, Windows NT, other unnamed Windows operating systems, or revisions of the above-mentioned systems. However, it should be understood that the present invention is not limited to any particular type of computer operating system.

In one aspect of the system 100, the tester application 104 represents logical access paths to the discovered UI elements using an XML format list of indexed UI elements. The XML language is well known in the art. However, the indexed UI elements may formatted in other public domain languages, or even as a proprietary language. The invention is not limited to any particular language format.

Generally, the tester application 104 identifies the UI element type, and the test plan 110 sends test messages responsive to the identified UI element type. For example, the tester application 104 may identify UI element types such as a menu, sub-menu, check box, text box, or variable UI elements. Then, the test plan 110 sends corresponding test messages such as menu select, sub-menu select, check box select, text box fill, or variable fill command messages. That is, a menu select test message is sent to a menu UI element, or a check box select test message is sent to a check box select UI element. Note, the above-mentioned list of UI elements is not intended to be a complete comprehensive list of every possible UI element. The present invention is not limited to the testing of any particular UI element types.

For example, if the tester application 104 identifies a variable UI element, the test plan 110 sends a test message to the AUT including: a command to populate the variable UI elements with a value; and, the populated value. The variable UI element may be tested using a plurality of different populated values.

Some aspects of the system 100 further comprise a client editing application 120 having an interface to the tester application 104 on line 122 and a graphical test plan editing UI 124 to accept user commands. For example, commands may be accepted from a QA operator. The tester application 104 edits the test plan in response to test plan editing UI commands. For example, the QA operator may seek to limit the testing of certain UI elements, or select a more probable range of values to populate the variable UI elements.

In some aspects, the tester application 104 includes a plug-in application 130 to automatically convert the generated access paths into automated test program software instructions. For example, the tester application 104 may generate automated test program software, using the plug-in 130, such as IBM RATIONAL® Test and QA PARTNER® programs. The above-mentioned test program software is listed as examples of currently available software that may be used with the present invention. However, the invention is not limited to any particular type of test program software. For example, the test program software may be proprietary.

FIG. 2 is a schematic block diagram illustrating the present invention as used for testing an application with several computer operating systems. Then, the system 100 comprises a plurality of operating systems 200 through 208. Again. Windows operating systems are used to illustrate the example, but the present invention is not limited to any particular type of manufacturer of operating systems. The GUI AUT (not shown) is installed in each operating system 200-208. The tester application 104 has an interface 210 through 218 to discover access paths to user interface (UI) elements in each corresponding operating system AUT. The tester application 104 supplies a test plan 220-226 for each corresponding operating system AUT 200-208. As an additional complexity, each human language (i.e., English, Spanish) AUT can be tested, and a test plan generated for each particular human language, for each particular operating system.

Thus, an application can be tested simultaneously on different versions of the Windows operating system by remotely interacting with the different versions of the OS installed in multiple machines via a network. Here, the tester application is installed in one workstation. The tester application discovers the UI elements in the application by driving the other workstations where the application is being tested with different OSs and different human languages.

Functional Description

FIG. 3 is a flowchart illustrating the present invention process for automatically generating a test plan. The application under test is passed to tester application. The tester application launches the application that is under test and starts querying for the top-level window. From the top-level window, the tester application queries and obtains all the user interface elements associated with the top-level window. If a user interface element contains additional user interface elements, these additional interface elements are also queried. This process called the "discovery phase" and continues until all the user interface elements of the application are identified. This list can be maintained in an XML format. The following XML code is an example of logical access paths discovered in an application entitled "Sharp Desk":

```
<Tester Version=XXX>
<Date: XX-XX-XXXX>
<Application under Test>
    <SharpDesk>
        <Main window=XXXXXX>
    <Menu Main Menu>
        <File Menu>
```

-continued

```
            <Command New>
            <Command Open>
            ;
            :
        </File menu>
        <Edit Menu>
            <Edit menu commands>
        </Edit Menu>
        ;
        ;
        <Menu Main Menu>
            </Application under Test>
```

The XML produced generates a basic test plan by using plug-ins for different automated test programs such as RATIONAL® Test, that exercise all the UI components of an application.

FIG. 4 is a flowchart illustrating an alternate aspect of the present invention method for generating graphical user interface (GUI) application automatic test plans. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 400.

Step 402 launches a GUI application under test (AUT). Step 404 discovers access paths to user interface (UI) elements in the AUT. Step 406 generates logical access paths to the discovered UI elements. Step 408 launches a test plan that uses the generated access paths. Step 410 sends test messages to UI elements in the AUT.

In some aspects of the method, discovering access paths to UI elements in the AUT in Step 404 includes discovering access paths to a UI window having a menu to present selections and to accept user commands. In other aspects, launching a GUI AUT in Step 402 includes launching an MS Windows operating system AUT, for Windows operating system such as Windows XP, Windows 2000, Windows 98, Windows ME, or Windows NT.

In some aspects, generating logical access paths to the discovered UI elements in Step 406 includes building an XML format list of indexed UI elements.

In one aspect, the method comprises a further step, Step 405, of identifying the UI element type. Then, sending test messages to UI elements in the AUT in Step 410 includes sending test messages responsive to the identified UI element type. For example, Step 405 may identify UI element types such as a menu, sub-menu, check box, text box, or variable UI elements. Then, Step 410 sends test messages to UI elements in the AUT such as menu select, sub-menu select, check box select, text box fill, or variable fill command messages. To further the example, if Step 405 identifies a variable UI element, Step 410 includes substeps. Step 410a sends a command to populate the variable UI elements with a value. Step 410b selects the populated value.

In other aspects of the method, Step 407a launches a client editing application. Step 407b generates a graphical test plan editing dialog. Step 407c edits the test plan in response to the test plan editing dialog.

In one aspect of the method, launching a test plan (Step 408) includes launching a plug-in application to automatically convert the generated access paths into automated test program software instructions, such as IBM RATIONAL® Test or QA PARTNERS® test program software.

In another aspect, launching a GUI AUT (Step 402) includes installing the AUT in a plurality of nodes, each having a different operating system. Then, discovering access paths to user interface (UI) elements in the AUT (Step 404) includes discovering access paths in each operating system AUT.

A system and method are provided for automatically generating a test plan, which is used in the testing of a software application under test. Some examples of computer languages, UI elements, and operating systems have been given to clarify the invention. However, the invention is not limited to merely these examples. Other variations and embodiments of the invention will occur to those skilled in the art.

We claim:

1. A method for generating graphical user interface (GUI) application automatic test plans, the method comprising:
    launching a GUI application under test (AUT);
    discovering access paths to user interface (UI) elements in the AUT;
    generating logical access paths to the discovered UI elements;
    launching a test plan that uses the generated access paths;
    sending test messages to UI elements in the AUT;
    wherein launching a test plan includes launching a plug-in application to automatically convert the generated access paths into automated test program software instructions selected from a group consisting of IBM® RATIONAL® Test and QA PARTNER® programs.

2. The method of claim 1 wherein discovering access paths to UI elements in the AUT includes discovering access paths to a UI window having a menu to present selections and to accept user commands.

3. The method of claim 1 wherein launching a GUI AUT includes launching an MS Windows operating system AUT.

4. The method of claim 3 wherein launching a Windows operating system AUT includes launching an application for a Windows operating system selected from the group including Windows XP, Windows 2000, Windows 98, Windows ME, and Windows NT.

5. The method of claim 1 wherein generating logical access paths to the discovered UI elements includes building an XML format list of indexed UI elements.

6. The method of claim 1 further comprising:
    identifying the UI element type; and,
    wherein sending test messages to UI elements in the AUT includes sending test messages responsive to the identified UI element type.

7. The method of claim 6 wherein identifying the UI element type includes identifying UI element types selected from the group including menu, sub-menu, check box, text box, and variable UI elements; and,
    wherein sending test messages to UI elements in the AUT includes sending test messages selected from the group including menu select, sub-menu select, check box select, text box fill, and variable fill command messages.

8. The method of claim 7 wherein identifying the UI element type includes identifying a variable UI element; and,
    wherein sending test messages to UI elements in the AUT includes:
        sending a command to populate the variable UI elements with a value; and,
        selecting the populated value.

9. The method of claim 1 further comprising:
    launching a client editing application;

generating a graphical test plan editing dialog; and editing the test plan in response to the test plan editing dialog.

10. The method of claim 1 wherein launching a GUI AUT includes installing the AUT in a plurality of nodes, each having a different operating system; and, wherein discovering access paths to user interface (UI) elements in the AUT includes discovering access paths in each operating system AUT.

11. A system for generating automatic test plans for graphical user interface (GUI) applications, the system comprising:

a GUI application under test (AUT); and, a tester application having a discovery interface connected to the AUT to discover access paths to user interface (UI) elements in the AUT, a test plan interface to supply a test plan that generates logical access paths to the discovered UI elements, and a plug-in application to automatically convert the generated access paths into automated test program software instructions selected from a group consisting of IBM® RATIONAL® Test and QA PARTNERS® programs.

12. The system of claim 11 further comprising:

a test plan having an interface with the AUT that uses the generated access paths to send test messages to UI elements in the AUT.

13. The system of claim 12 wherein the tester application identifies the UI element type; and, wherein the test plan sends test messages responsive to the identified UI element type.

14. The system of claim 13 wherein the tester application identifies UI element types selected from the group including menu, sub-menu, check box, text box, and variable UI elements; and, wherein the test plan sends corresponding test messages selected from the group including menu select, sub-menu select, check box select, text box fill, and variable fill command messages.

15. The system of claim 14 wherein the tester application identifies a variable UI element; and, wherein the test plan sends a test message to the AUT including:

a command to populate the variable UI elements with a value; and, the populated value.

16. The system of claim 11 wherein the tester application discovers access paths to AUT UI element windows having a menu to present selections and to accept user commands.

17. The system of claim 11 further comprising:

an MS Windows operating system; and, wherein the GUI AUT is installed in the Windows operating system.

18. The system of claim 17 wherein the Windows operating system is selected from the group including Windows XP, Windows 2000, Windows 98, Windows ME, and Windows NT.

19. The method of claim 11 wherein the tester application represents logical access paths to the discovered UI elements using an XML format list of indexed UI elements.

20. The system of claim 11 further comprising:

a client editing application having an interface to the tester application and a graphical test plan editing UI to accept user commands; and, wherein the tester application edits the test plan in response to test plan editing UI commands.

21. The system of claim 11 further comprising:

a plurality of operating systems;

wherein the GUI AUT is installed in each operating system; and, wherein the tester application has an interface to discover access paths to user interface (UI) elements in each operating system AUT.

22. The system of claim 21 wherein the tester application supplies a test plan for each operating system AUT.

* * * * *